July 2, 1968 J. A. CORL ET AL 3,391,377
ELECTRICAL DISTRIBUTION SYSTEM
Filed Sept. 10, 1965 3 Sheets-Sheet 1
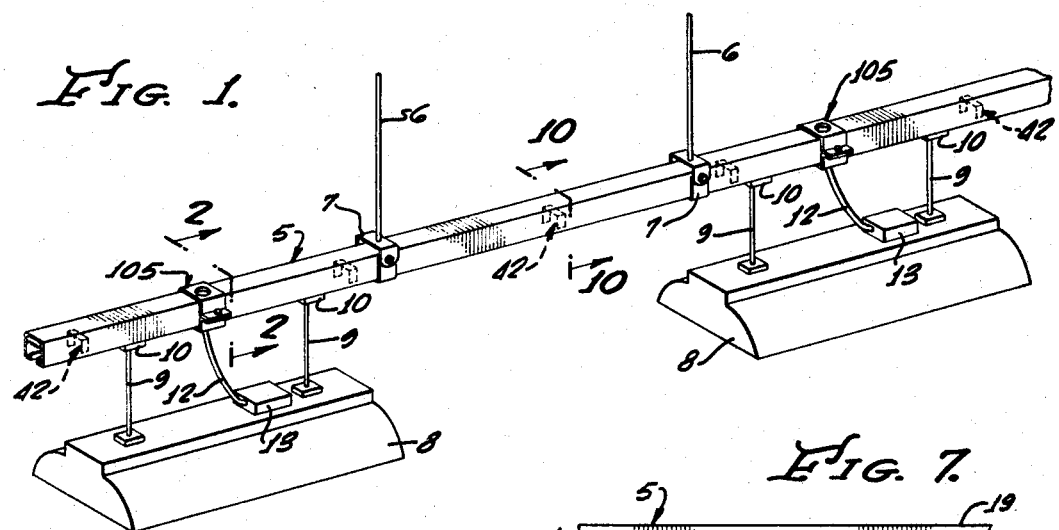
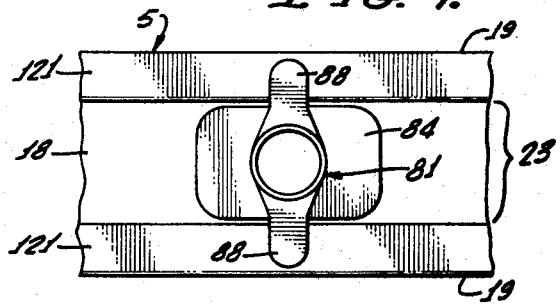
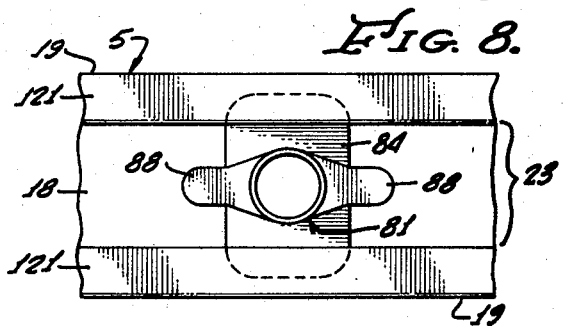
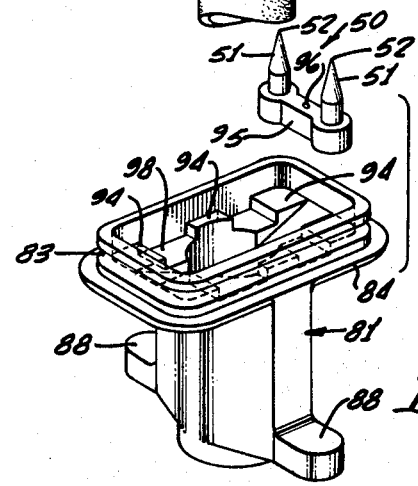
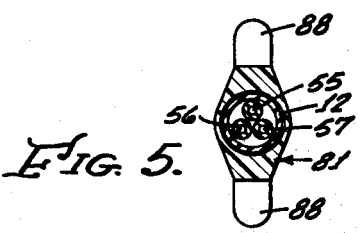
INVENTORS.
CECIL J. MAYO
JAMES A. CORL
BY FOWLER, KNOBBE
& GAMBRELL
ATTORNEYS.

INVENTORS.
CECIL J. MAYO
JAMES A. CORL
BY FOWLER, KNOBBE
& GAMBRELL
ATTORNEYS.

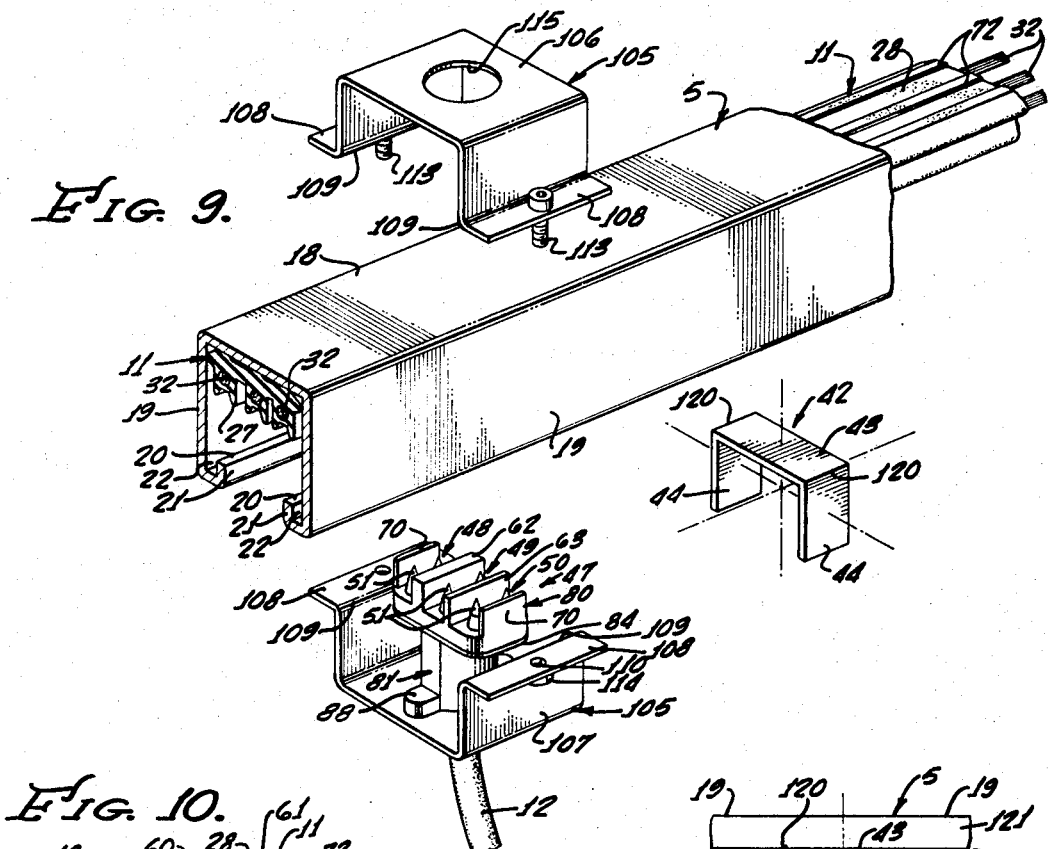

United States Patent Office 3,391,377
Patented July 2, 1968

3,391,377
ELECTRICAL DISTRIBUTION SYSTEM
James A. Corl and Cecil J. Mayo, San Carlos, Calif., assignors to Insul-8-Corp., San Carlos, Calif., a corporation of California
Filed Sept. 10, 1965, Ser. No. 486,434
12 Claims. (Cl. 339—21)

ABSTRACT OF THE DISCLOSURE

A generally flat flexible electric cable having spaced parallel internal conductors is positioned within and against the base of an elongated U-shaped metal channel having lips defining an opening narrower than its internal width. A power plug having a laterally elongated head with upstanding sharp conductive prongs on its upper surface is inserted through the channel opening and rotated 90°. An elongate tongue is disposed between and extends beyond the prong tips on the head, and engages a corresponding elongate groove formed in the front face of the cable, for orienting and guiding the plug relative to the cable. A clamp carried by the channel forces the prongs towards the cable to pierce the cable insulation and contact the conductors.

---

This invention relates to electrical distribution systems which may be tapped at any selected locations along their lengths without stripping or cutting the conductors, and, more particularly, to such systems which include structural channels of the type often suspended overhead in long spans to support electrical lighting fixtures and the like.

In many factories, shops, offices and other buildings, it is desirable to change the lighting arrangement and location of electrical equipment frequently to adapt to needed changes in the use of the space. If extension cords are used to accomplish the changes, an unsightly appearance is created, not to mention a safety hazard as well. On the other hand, the expense of relocating the power outlets in conventionally wired installations has been prohibitive. It is for these reasons that various systems have been developed which seek to maximize the flexibility of the fixture and outlet locations while minimizing the cost of initial installation and subsequent relocation.

In one system now commonly used for supporting fixtures, structural steel channels are joined and suspended horizontally overhead, and the lighting fixtures and outlets are supported from the channels by brackets which may be moved to any location along the span to change the lighting and outlet arrangement. That system provides the desired mechanical flexibility, but if conventional wiring is used with it, the electrical rewiring problem remains. In the past, conventional wiring generally has been used because the prior art conductor systems adapted to be tapped at any location along their length have not been wholly satisfactory for use with the channel fixture support system. Many of such conductor systems have a tapping arrangement such that the conductor or the plug can not be appropriately sized and shaped to fit within the channel without interfering with use of the channel as a fixture support. Others create an unsafe condition if placed interior of the metal channel because of the danger of short-circuits between the channel and the conductors or plugs.

The danger of short-circuiting is compounded if the supporting channel is suspended with its open side facing up in order to retain the conductors or cable. The cable or wires then tend to accumulate dust, dirt and moisture. Since most cables of this type have some portion of the conductors exposed, at least adjacent the tapping plug, such accumulation of conductive impurities on the cable can be very dangerous.

On the other hand, if the conductors are not housed within the fixture support channels, the installation cost generally increases considerably because a separate support system is needed. Further, the separate conductors are, in many instances, unsightly since they must be located where they are readily accessible to fully realize their versatility.

This invention overcomes a number of the problems mentioned above by providing an insulated electrical conductor cable particularly adapted to be mounted within a conventional generally U-shaped fixture supporting channel, and electrical plugs adapted to be conveniently and securely connected to the conductors at any location along their uninterrupted lengths. The cable is formed so that it can be shipped in coils and unwound and inserted through the opening in the channel after the channel has been installed. By this means, the inconvenience and expense of modular length ducts with special joints for mechanical and electrical connections are eliminated. Further, the channels, the cables and the conductors may be independently selected for the particular structural and electrical load requirements of the building. Even after an initial installation, the cable can be replaced by a cable of higher current carrying capacity if necessary, without tearing down the entire overhead electrification system and starting all over again.

Broadly, the invention comprises the combination of and claimed subcombinations of a flexible multi-conductor cable, means for retaining the cable interior of an elongate support member, a power plug, and means for guiding the plug into contact with the conductors. The elongate support member is formed in one or more sections connected in end-to-end relationship with an elongate slot formed in one of its sides. The cable is coiled in continuous lengths for storage. As it is uncoiled, it is inserted through the support member in lengths independent of the lengths of the support member sections. The plug is adapted to be inserted through the slot and into electrical contact with the conductors without stripping or severing the cable.

In an exemplary embodiment, the plug has sharp prongs for piercing the cable. An elongate tongue extends from the plug beyond the prongs and is inserted into a complementary elongate groove in the cable to guide the prongs into place. A pair of shoulders on the plug are adapted to cooperate with a clamp to force the prongs into the conductors and retain them there. Means are provided to prevent the plug from penetrating too deeply into the conductors and damaging the system.

The cable, in an exemplary embodiment, is generally flat or rectangular in cross-section with the conductors spaced laterally across its width. Ribs on the edges of the cable contact the channel sides to orient the cable transverse to the channel member. These ribs are located a substantial distance from the grooved face to increase the surface leakage path to the channel sides.

These and other features and objects of this invention will be apparent from the following detailed description when read with reference to the accompanying drawings, in which:

FIG. 1 is a perspective view of a fixture supporting system and an electrical distribution system embodying this invention;

FIG. 4 is a side view of an electrical plug constructed in accordance with this invention;

FIG. 5 is a section view taken generally along lines 5—5 of FIG. 4;

FIG. 6 is an exploded perspective view showing a portion of the plug;

FIGS. 7 and 8 are bottom plan views of the channel showing the plug in position for insertion through the slot and for piercing the conductors, respectively;

FIG. 9 is an exploded perspective view of a portion of the electrical distribution system;

FIG. 10 is an enlarged section view taken generally along lines 10—10 of FIG. 1;

FIGS. 11–13 are bottom plan views of the channel showing the sequence of steps in inserting a cable retaining clip in the channel; and, FIG. 14 is an elevation view of the channel with portions removed to show the retaining clip being rotated from the position illustrated in FIG. 12 to the position illustrated in FIG. 13.

Figure 2:
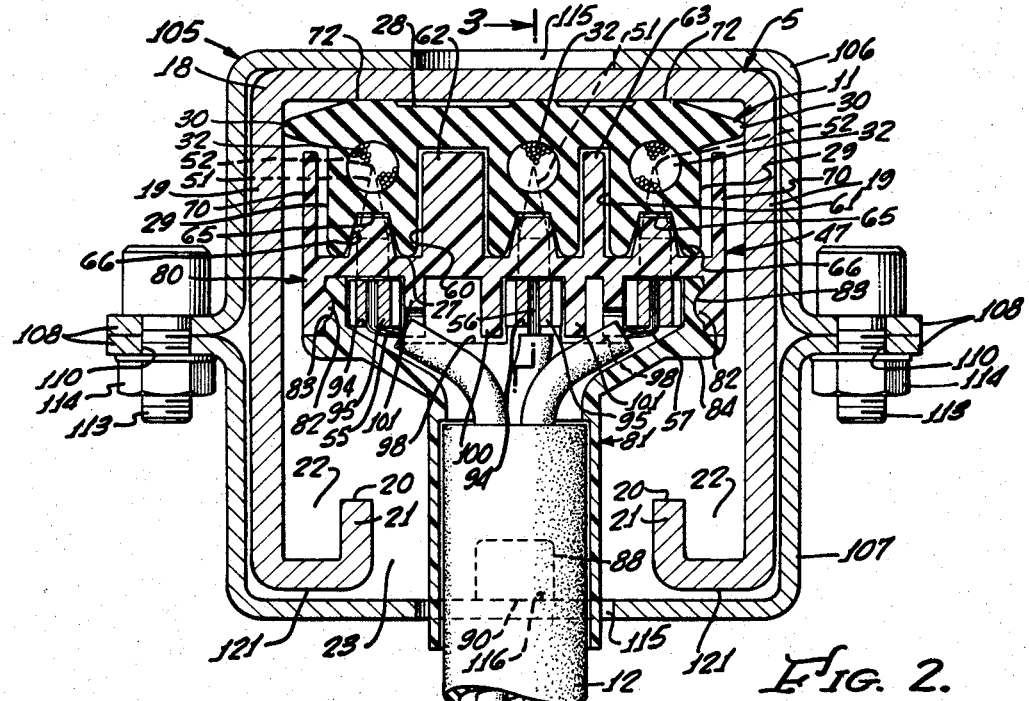
FIG. 2 is an enlarged section view taken along lines 2—2 of FIG. 1.

Referring to FIGS. 1 and 2, a plurality of structural steel channels 5 joined end-to-end to form a long straight horizontal run over a room area, are suspended from the overhead structure of a building by hanger rods 6 and hanger brackets 7. Electrical fixtures such as lights 8 are supported from the structural channel 5 by fixture hanger rods 9 and brackets 10 which may be moved to any selected location along the channel. The channel 5 is formed in the shape of a U with a base 18 and two perpendicular sides 19, and as can be seen has a depth which is at least approximately equal to its width. In the illustrative embodiment, it is installed in an inverted position with its opening facing downward.

The lower edge 20 of each of the channel sides 19 is bent inwardly and upwardly to form a U-shaped lip 21 defining an elongated internal gutter 22 in which the fixture supporting brackets 10 are supported. The two inwardly extending lips define an elongated slot 23 providing access to the interior of the channel. Such U-shaped channels are well known in the art and are available commercially, e.g., from Unistrut Corporation, Wayne, Michigan. These channels form a part of this invention only to the extent that they are one element in the novel electrical distribution system disclosed and claimed herein.

Electrical power is supplied to each fixture 8 from a cable 11 within the channel 5 through a power feed cord 12 and a conventional junction box 13. The power supply cable 11 which is flat and generally rectangular in cross-section, is housed within the metal channel 5 with its faces 27, 28 extending more or less parallel to the channel base 18. A rib 30 protrudes from each edge 29 of the cable to abut the channel sides 19 and position the cable relative to the channel.

The power cable 11 includes three stranded metal conductors 32 held in spaced-apart relation within a body of insulating material 35. The conductors 32 are spaced transversely with respect to the lay of the cable, having their central axes 36 in a common plane parallel to the faces 27, 28. The cable may be formed, for example, by extruding a thermoplastic insulating material such as polyvinyl chloride directly onto the stranded conductors 32. As can be seen, the conductors are totally encased within the material of the body.

Longitudinally spaced U-shaped retaining clips 42 (see FIGS. 1 and 10), having a flat upper member or bight 43 which abuts the front face 27 of the cable and two perpendicular legs 44 which fit in the gutters 22, hold the rear 28 of the cable against the upper or rear side 18 of the channel. Thus, the clips 42 and the ribs 30 cooperate to positively locate the conductors relative to the channel.

The plug 47, which is removably connected to the stranded conductors 32 to tap power from them (see FIGS. 2–4), includes three sets 48, 49, 50 of conductive prongs 51, one set for each stranded conductor 32. These prongs 51 each have a sharp point 52 to pierce the insulation 35 and contact the stranded conductors 32. As will be described hereinafter, the two prongs of each set are commoned to their respective wires 55, 56, 57 which lead out of the plug 47 to provide power for the lighting fixture, outlet, or other electrical device.

Two elongated grooves 60, 61 formed in the front face of the cable between the conductors are adapted to receive complementary tongues 62, 63 on the plug 47. These mating tongues and grooves initially orient the plug and guide the plug laterally relative to the cable to assure that the prongs 51 contact the conductors. One groove 60 and its mating tongue 62 are substantially wider than the other tongue 63 and groove 61 so that the plug may be oriented relative to the cable to assure proper phase orientation if polarity is important. Three elongated grooves or depressions 65 having tapered sides 66 are formed in the front face of the cable opposite each of the three conductors 32 to receive tapered projections 67 surrounding the base of each prong 51 to further assist in guiding the points of the prongs into the conductors.

The mating tongues 62, 63 and grooves 60, 61 and the mating projections 67 and depressions 65, also lengthen the surface leakage path between adjacent conductors. Similarly, skirts 70 on the plug extend between each edge 29 of the cable and the adjacent side 19 of the channel to increase the surface leakage path between the conductors and the channel in the event the plug contacts the channel. The leakage path between the conductors and the channel along the surface of the cable is also lengthened by the ribs 30, since they space the edges 29 of the cable from the channel sides 19.

The cable 11 is designed to be coiled for shipment and therefore has spaced elongate ridges 72 on its back 28 which conform to the depressions 65 in its front face to stabilize the coil. As seen, the ridges are very low so that the rear face 28 of the cable body is essentially planar, adapting it to be compressed against the channel base by the plug.

Figure 3:
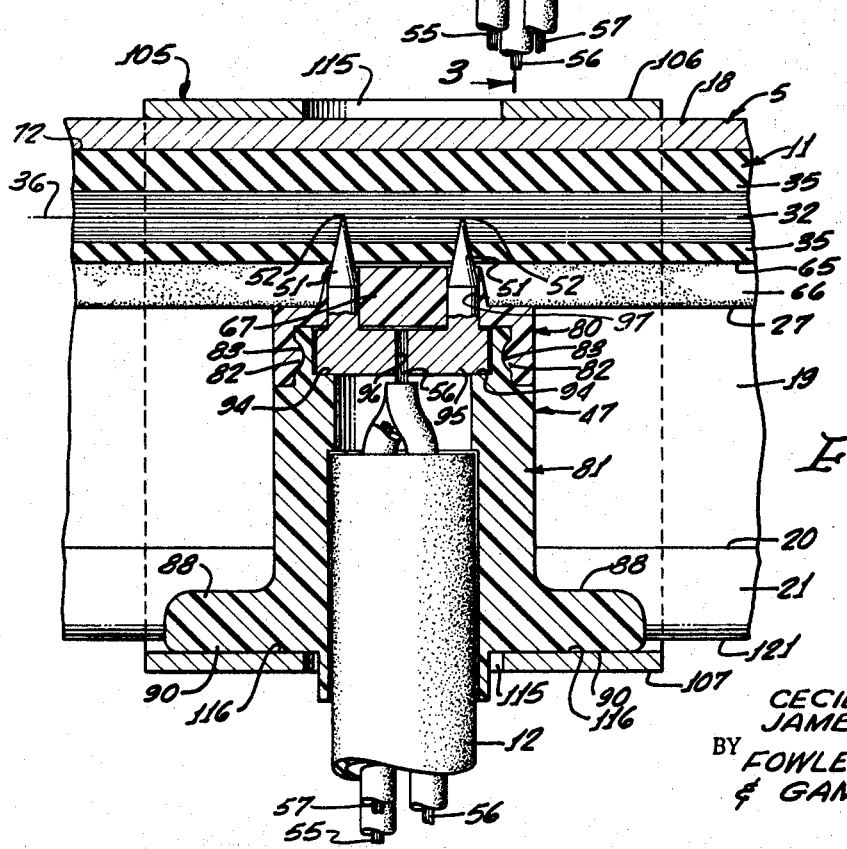
FIG. 3 is a section view taken generally along line 3—3 of FIG. 2.

Referring generally to FIGS. 4–6 as well as FIGS. 2 and 3, it can be seen that the plug includes a generally hollow body member 81 having an enlarged rectangular head base portion 84 on one end. A pair of outwardly extending arms 88 on opposite sides of the other end of the body member 81 form shoulders 90 facing away from the head base 84. A cap member 80 which includes the upstanding tongues 62, 63 and skirts 70 is removably connected to the enlarged head base portion 84 of the body by inwardly disposed bosses 82 on the lower portion of the cap cooperating with complementary recesses or grooves 83 formed around the periphery of the head portion.

The enlarged head base 84 has three spaced-apart land areas 94 on its upper internal surface, each of which is adapted to receive one set of the prongs 48, 49, 50. The two prongs 51 of each set are interconnected by a metallic base terminal 95. An aperture 96 through the center of each base terminal 95 receives a respective one of the wires 55–57 of the power cord 12 which extends through the hollow body member for connection to an electrical fixture. With the cap 80 removed from the head base 84, the wires may be connected to the prong terminals 95 in a conventional manner, as by soldering.

The cap member 80 has a series of spaced-apart apertures 97 therein through which the ends of the prongs 51 extend when the cap is snapped into position on the head base portion 84 of the body member. A pair of tongues or flanges 100, 101 extend downward from the cap member intermediate adjacent sets of prongs into recessed areas 98 between the lands 94. The flanges abut the sides of the terminals 95 to retain them in place, and also increase the surface leakage path between the adjacent terminals.

In review, and as plainly seen in the drawings, the plug body has a laterally elongated or enlarged rectangular head on its upper end comprised of the cap member 80 and the base 84. The elongate tongues extend transversely across the elongate upper surface of the head perpendicular to the long lateral dimension of the head, and reside between the sets of sharp prongs which are upstanding at spaced-apart locations across the upper surface of the head. The spacing between the sets of prongs, and the corresponding spacing between the conductors in the cable body is asymmetrical so as to accommodate the wide tongue 62 and its accommodating wide cable groove 60 at an off-center location with respect to the head and cable body within the confines of the channel. As seen, the wide groove is accommodated between adjacent conductors which are spaced apart substantially farther than other adjacent conductors and is located off-center with respect to the cable body. The wide tongue is correspondingly located between two adjacent sets of prongs spaced apart substantially farther than other adjacent sets and at an off-center position on the head.

The oppositely extending arms 88 located adjacent the opposite end of the plug body, like the tongues extend transversely with respect to the long lateral dimension of the head so that, as shown in FIGS. 2 and 3, the arms which are narrower than the channel slot will fit into the channel slot after the head is inserted and rotated.

A clamp 105 which holds the plug 47 in connection with the cable is shown most clearly in FIGS. 2 and 9. Upper and lower U-shaped brackets 106, 107, each having outwardly extending flanges 108 along their edges 109, are adapted to be connected with their edges 109 mating to surround the channel 5. Each flange 108 includes an opening 110 for receiving a connecting bolt 113 which threads into a nut 114 spot-welded onto each flange 108 of the lower bracket 107.

An aperture 115 through the lower bracket loosely receives the body 81 of the plug. The interior surface 116 of the lower bracket 107 adjacent the aperture 115 bears on the shoulder 90 of the plug to clamp the plug in the cable. The upper bracket 106 includes a similar aperture 115 so that the two brackets may be made from identical stampings, and further because it is sometimes desirable to reverse the brackets so that the bolts 113 may be threaded into the nuts 114 from below.

To install the system, after the channels 5 are joined end-to-end and suspended overhead in the conventional manner illustrated in FIG. 1, the cable 11 is uncoiled or payed-out and inserted through the slot 23 in long lengths; generally, the cable in each straight run of channel being continuous. As the cable 11 is wider than the slot 23, it is inserted edgeways through the slot, and then is rotated axially interior of the channel to the position shown in FIG. 2.

As the cable is placed in the channel, the retaining clips 42 are installed to hold it in place. Since the clips are intentionally too large to be installed directly in the retaining position, they are inserted by the sequence of steps shown in FIGS. 11–14.

First, a clip 42 is slipped through the slot 23 to lay flat against the cable with the legs 44 of the clip extending generally transverse to the channel sides 19, and the bight 43 extending along the slot (see FIG. 11). The clip is then rotated inside the channel to the position shown in FIG. 12 wherein its legs 44 extend along the channel sides 19 and its bight is transverse to the slot. Since the dimension from the end of either leg to the opposite bend 120 of the clip is greater than the inside width of the channel, the clip is preferably made of resilient thermoplastic so that it will deform slightly in rotating from the position of FIG. 11 to that of FIG. 12.

Next, the clip is rotated through the position shown in FIG. 14 to the upright supporting position shown in FIGS. 10 and 13. As the clip is so rotated, the resilient front face 27 of the cable is deformed by the clip as shown in FIG. 14. Thus, as the clip is rotated past the position of FIG. 14, it snaps into the upright position where it locks between the cable and the gutters 22 so that it will not fall out accidentally, but can be removed by rotating it with sufficient thumb pressure to compress the insulation.

The plug 47 is inserted through the slot with the elongate or wide dimension of its rectangular head parallel to the channel sides 19 (see FIG. 7), and is then rotated 90° about its axis by use of the arms 88 to the position shown in FIG. 8 so that the head tongues are aligned with the cable grooves and the arms are aligned with the channel slot, whereupon it may be inserted into the cable. In the rotated position illustrated in FIG. 8, the plug will not pass through the slot 23 so that it need not be held while the clamp 105 is being assembled. As is clearly shown in FIGS. 2 and 4, the tongues 62, 63 and the skirts 70 extend beyond the tips 52 of the prongs to protect the prongs from unduly catching on the cable as the plug is rotated to alignment so that alignment is discernible.

Next, the upper and lower brackets 106, 107 of the clamp are connected around the channel with the lower bracket 107 bearing upward on the plug shoulders 90 as shown in FIGS. 2 and 9. As the bolts 113 are threaded into the nuts 114, the lower bracket acts on the shoulders 90 to force the prongs 51 through the insulation 35 and into the conductors 32. The use of two prongs in each set, as well as the elongate shape of the tongues 62, 63, grooves 60, 61, depressions 65, and projections 67, stabilizes the plug in the longitudinal direction of the slot when the plug is inserted in the cable.

The brackets 106, 107 are so dimensioned that the flanges 108 meet when the prongs have penetrated the stranded conductor the desired distance to avoid any danger of tightening the bolts 113 too far and damaging the cable or the plug. The tongues 62, 63 also cooperate with the grooves 60, 61 and the tapered projections 67 cooperate with the tapered depressions 65 to limit penetration of the plug into the cable. A further safety factor is provided in that the shoulders 90 are nearly in the plane of the lower surface 121 of the channel lips 21 when the plug is fully in place so that only limited movement could result from further pressing upward on the lower bracket.

In some instances, a resilient clamp which snaps into the gutters 22 can be used in lieu of the circumscribing clamp 105; although the clamp illustrated is generally preferred because of its simple construction and its ease of installation.

In order to relocate the plug at a different position along the cable, the clamp bolts 113 are unscrewed and the plug is pulled out of the cable and reconnected at the desired position. The holes made in the cable insulation by the prongs are quite small and are practically filled in by the resilient insulation 35 when the prongs are removed so that they need not be taped or covered in any other manner.

The above-described embodiment is intended to be illustrative only, and the scope of the invention should be limited only in accordance with the following claims.

We claim:
1. An electrical distribution system adapted to cooperate with an elongate U-shaped channel member having its edges turned in to form lips defining an elongate slot therebetween comprising, in combination:
 (a) an insulated cable having a plurality of spaced-apart conductors totally encased therein adapted to be placed interior of said channel with the conductors spaced transverse to the slot;
 (b) a power plug insertable through said slot having a plurality of sharp prongs extending upright therefrom for piercing the cable insulation to contact said conductors;
 (c) an outwardly extending shoulder formed on the plug spaced away from said prongs;
 (d) a clamp operable to cooperate with said plug shoulder and said channel member to hold said prongs adjacent said cable;

(e) means for operating said clamp to move said plug toward said cable to force said prongs into the cable insulation; and, (f) means for limiting operation of said clamp when said prongs have penetrated the cable insulation a pre-selected distance.

2. The apparatus of claim 1 wherein the means for limiting the operation of said clamp when said prongs have penetrated the cable insulation a preselected distance comprises mating surfaces on said plug and cable which surfaces abut to limit further penetration.

3. An electrical power supply cable adapted to be payed out from a coil and installed in a U-shaped structural channel member having its edges turned in to form lips defining an elongate slot therebetween, said cable being constructed so that it may be tapped at any point along its length by a tapping plug having sharp conductive prongs and tongue guide means extending beyond the prongs, comprising:

(a) at least three spaced-apart longitudinally oriented electrical conductors maintained in substantially a common plane;

(b) an elongate body of flexible insulating material generally rectangular in cross-section, extruded on said conductors to encapsulate them;

(c) one side of said body defining a longitudinal groove between two conductors and extending in depth beyond the conductors to receive the tongue guide means of the tapping plug;

(d) the opposite side of said body being adapted to abut the rear interior surface of the channel; and, (e) the edges of said cable forming ribs a substantial distance from said one side of the cable for abutting the sides of the channel to space the cable in the channel and extend the surface leakage path between the conductors and the sides of the channel.

4. A plug for removable connection to a substantially flat electrical cable having a plurality of spaced-apart conductors and installed in a U-shaped metal channel having depth which is at least approximately equal to its width and having its edges turned in to form lips defining an elongate slot therebetween narrower than the internal width of the channel, the electrical cable having an off-center elongate groove therein extending between two of the conductors, said plug comprising:

(a) a body of insulating material having a laterally elongated head on one end, the head having an elongate upper surface adapted to engage across the cable;

(b) a plurality of sharp conductive prongs extending upright from the upper surface of said head in spaced-apart relation, said prongs being arranged in sets each including at least one prong and all the prongs in each set being electrically commoned; and, (c) at least one elongate tongue disposed off-center on the upper surface of the head between two adjacent sets of prongs and extending across said surface transversely to the elongated dimension of the head, the tongue extending upright from said surface for at least substantially the same distance as the prongs.

5. A plug for removable connection to an electrical cable in accordance with claim 4 wherein:

(a) a base portion of said head is formed integral with said plug body;

(b) said prongs are removably disposed on said base portion; and, (c) the prongs are maintained in place by a cover portion that fits over said prongs and snaps into place on said base portion.

6. A plug for removable connection to an electrical cable in accordance with claim 4 wherein:

(a) the body of insulating material has oppositely extending lateral arms disposed adjacent its other end; and (b) the lateral arms extend along a direction transverse to the long lateral dimension of the head.

7. An electrical distribution system adapted to cooperate with an elongate U-shaped channel member having a depth which is at least approximately equal to its width and having a base, two sides and its edges turned in to form lips defining an elongate slot therebetween narrower than the internal channel width comprising, in combination:

(a) an insulated substantially flat cable having a plurality of spaced-apart conductors totally encased therein adapted to be placed interior of said channel against the base thereof with the conductors spaced transverse to the slot;

(b) a power plug including an enlarged generally rectangular head having an upper surface, the longer dimension of said rectangular head being greater than the spacing between the channel lips and the shorter dimension of the head being less than said spacing;

(c) a plurality of sharp conductive prongs upstanding on the upper surface of said head for piercing the cable insulation and contacting said conductors with the longer dimension of the rectangular head transverse to the channel length; and, (d) a clamp engageable with the channel and the plug for compressing the cable between the channel base and upper surface of the plug head and forcing the prongs through the cable insulation into contact with the conductors.

8. An electrical distribution and fixture supporting system comprising, in combination:

(a) an elongate inverted U-shaped channel suspended over a work area and adapted to support electrical light fixtures, said channel having its edges reversely bent to form internal U-shaped gutters and define an elongate slot between the edges;

(b) a flat flexible elongate insulated cable interior of said channel, enclosing three conductors spaced transverse to said slot with their axes substantially in a common plane, the lower face of said cable defining at least one elongate groove extending in depth beyond the conductors;

(c) ribs on the edges of said cable abutting the channel sides to space the cable in the channel, said ribs being a substantial distance from said lower face of the cable to extend the surface leakage path between the conductors and the channel sides;

(d) a plurality of resilient U-shaped clips spaced along said channel member, each having legs engaged in said gutters, said legs being joined by a cross member bearing against the lower face of said cable to retain said cable against the upper interior surface of said channel;

(e) a power plug having a substantially rectangular enlarged head insertable through said slot with its narrow sides transverse to the channel edges, the dimensions of said plug being selected so that it may be rotated interior of the channel;

(f) a plurality of sharp prongs extending from said head for piercing the cable insulation and electrically contacting said conductors, said prongs being arranged in three sets of two prongs, each set being adapted to contact a respective one of the conductors;

(g) at least one tongue extending from said head beyond the tips of the prongs for insertion into said elongate groove of the cable;

(h) a pair of shoulders extending outward from said plug and so spaced from said prongs that when said plug is in place in the cable, the shoulders are slightly exterior of the channel;

(i) a clamp adapted to cooperate with said plug shoulders and said channel to hold said plug adjacent said cable;

(j) means for closing said clamp to force said prongs into the cable to contact the conductors; and, (k) means associated with said clamp for limiting closure of said clamp when said prongs have penetrated the conductors a pre-selected distance.

9. An electrical power supply cable adapted to be payed out from a coil and installed in a U-shaped structural channel member having its edges turned in to form lips defining an elongate slot therebetween, said cable being constructed so that it may be tapped at any point along its length by a tapping plug having upstanding sharp conductive prongs and tongue guide means, comprising:

(a) at least three spaced-apart longitudinally oriented stranded metal conductors extending parallel to one another and having central axes maintained approximately in a common plane;

(b) the spacing between two adjacent conductors substantially exceeding the spacing between other adjacent conductors;

(c) an elongate generally flat body of flexible insulating material extruded on said conductors to totally encase them internally within the material of the body;

(d) the body having a rear face which is approximately planar adapting it to be compressed against the interior base of the channel by the tapping plug; and, (e) the body having a front face in which a longitudinal groove is formed between said two conductors for receiving the tongue guide means of the tapping plug, the groove extending in depth to at least the common plane of the central axes of the conductors.

10. An electrical distribution system adapted to cooperate with an elongate U-shaped metal channel having a depth which is at least approximately equal to its width, the channel being formed in one or more sections connected in end-to-end relationship and having a base, opposite side walls extending approximately perpendicularly from the base, and turned in edges forming lips interior of the channel and defining an elongate slot between the lips narrower than the interior width of the channel, said system comprising, in combination:

(a) a generally flat flexible cable adapted to be inserted and retained interiorly of the channel against the base thereof, comprising an elongate body of electrical insulating material having a front and rear face, and a plurality of parallel stranded metal conductors totally encased internally within the material of the cable body, the conductors being spaced apart transversely with respect to the lay of the cable and having central axes which lie approximately in a common plane parallel to the faces of the cable body;

(b) means engageable with the channel lips for retaining the cable within the channel with its rear face against the base of the channel;

(c) a power plug comprising a body of electrical insulating material having a laterally elongated head at one end dimensioned to be inserted through the channel slot, rotated within the channel and retained above the channel lips, the head having an elongate upper surface adapted to engage across and mate with the front face of the cable body, and a plurality of upstanding sharp conductive prongs disposed at spaced-apart locations across the upper surface of the head for piercing the cable insulation to contact conductors in the cable body;

(d) means for orienting and guiding the power plug relative to the cable internally of the channel so that the prongs accurately pierce the cable body to contact conductors; and, (e) a clamp engageable with the channel for supporting the power plug in engagement with the lower face of the cable, the clamp including operating means for advancing the power plug toward the base fo the channel to force the upstadning prongs through the cable insulation and into contact with conductors therein.

11. The apparatus of claim 10 wherein:

(a) the rear face of the cable body is approximately planar adapting it to be compressed against the channel base of the power plug;

(b) the front face of the cable body has a longitudinal groove formed between two adjacent conductors and extending in depth at least to the common plane of the conductor axes;

(c) the power plug has an elongate tongue extending across the upper surface of its head between two adjacent sets of prongs and transverse to the long lateral dimension of the head; and, (d) the tongue extends upright from said surface at least to the tips of the prongs and is adapted to mate with the cable groove to provide means for orienting and guiding the plug relative to the cable internally of the channel.

12. The apparatus of claim 11, wherein:

(a) said two adjacent conductors are spaced apart substantially farther than other adjacent conductors;

(b) the cable groove is located off-center with respect to the cable body; and (c) the elongate tongue is located off-center with respect to the plug head.

References Cited

UNITED STATES PATENTS

| | | | |
|---|---|---|---|
| 2,108,031 | 2/1938 | Acuff | 339—21 |
| 2,162,545 | 6/1939 | Benander et al. | 339—99 |
| 3,097,035 | 7/1963 | Despard | 339—99 |
| 3,130,921 | 4/1964 | Morgan | 339—21 |
| 3,215,969 | 11/1965 | Verrone | 339—21 |

FOREIGN PATENTS 1,261,306  4/1961  France.

MARVIN A. CHAMPION, *Primary Examiner.*

P. A. CLIFFORD, *Examiner.*